United States Patent [19]

Mifsud

[11] 4,410,062

[45] Oct. 18, 1983

[54] TUNED VIBRATOR WITH A COMPLIANT CONNECTION TO THE BASE PLATE

[75] Inventor: Joseph F. Mifsud, Houston, Tex.

[73] Assignee: Exxon Production Research Co., Houston, Tex.

[21] Appl. No.: 215,774

[22] Filed: Dec. 12, 1980

[51] Int. Cl.³ .......................... G01V 1/047; G01V 1/55
[52] U.S. Cl. ..................................... 181/121; 181/401; 367/189
[58] Field of Search ............... 367/189; 181/106, 113, 181/119, 121, 401; 73/666; 166/249

[56] References Cited

U.S. PATENT DOCUMENTS

| | | | |
|---|---|---|---|
| 3,185,250 | 5/1965 | Glazier | 181/401 |
| 3,282,372 | 11/1966 | Brown et al. | 181/121 |
| 3,291,249 | 12/1966 | Bays | 181/119 |
| 3,363,720 | 1/1968 | Mifsud et al. | 181/401 |
| 3,489,240 | 1/1976 | Griffith et al. | 181/401 |
| 3,578,102 | 5/1971 | Ross | 181/401 |
| 4,014,403 | 3/1977 | Mifsud | 181/121 |
| 4,049,077 | 9/1977 | Mifsud | 181/401 |

OTHER PUBLICATIONS

Chichinin, "Theoretical Studies of the Vibration Radiation of Seismic Waves with a Given Spectrum", 8/78, Geologiya i. Geofizika, vol. 19, #8, pp. 85-96.

*Primary Examiner*—Nelson Moskowitz
*Attorney, Agent, or Firm*—Alfred A. Equitz; James S. Hsue

[57] ABSTRACT

To increase the energy of seismic waves transmitted by a vibrator, one or more compliant members are connected between the driver and the base plate of the vibrator. The compliance of the compliant member is such that it is substantially rigid at the natural frequency of the vibrator, and that the natural frequency of the driven load of the vibrator is in the siesmic spectrum but is higher than the natural frequency of the vibrator.

1 Claim, 2 Drawing Figures

TUNED VIBRATOR WITH A COMPLIANT CONNECTION TO THE BASE PLATE

BACKGROUND OF THE INVENTION

1. Field of the Invention

The present invention relates to improvements in vibrators used to create seismic waves for seismic prospecting. More particularly, it relates to apparatuses for increasing the energy of the seismic waves transmitted by vibrators into the earth.

2. Description of the Prior Art

In seismic prospecting, it is necessary to provide a source of energy for introducing waves into the earth formation to be explored. These waves propogate through the formation, are reflected in part by discontinuities in the formation, and subsequently are detected by geophones or other measuring devices at the earth's surface. The characteristics of the reflected waves are compared with the characteristics of the waves at their introduction into the formation. This comparison reveals valuable information about the structure of the formation and the probability of the presence of petroleum accumulations in the formation. It has become common to use mechanical devices known as seismic vibrators to induce waves in the earth.

A typical seismic vibrator includes a base plate in contact with or coupled to the earth, and a driver, which is rigidly connected to the base plate and which reciprocates the base plate at selected frequencies and amplitudes. The driver is typically a hydraulically operated piston-cylinder assembly, with the piston rigidly connected to the base plate. As the piston is reciprocated hydraulically within the cylinder, it causes the base plate to vibrate, thereby introducing seismic waves into the earth.

As the driver reciprocates the base plate, a portion of the earth underneath the base plate is also reciprocated by vibrations of the base plate. This portion of the earth and the base plate together are known as the driven load of the vibrator. The base plate is rigidly connected to the driver, so that the base plate must vibrate in phase with the driver. The vibrating system comprising the driver and the driven load typically has only one natural frequency in the seismic spectrum. This natural frequency varies with the compliance of the earth underneath the base plate and is usually between 15 and 25 Hz. This natural frequency is also known as the fundamental vibrator-ground resonance frequency. Vibrators are usually used to transmit seismic waves over a range of frequencies. The useful frequency range of a vibrator, or its seismic spectrum, is typically from 10 Hz to about 100 Hz. It is well known that, if operated at the same power to transmit seismic waves over a range of frequencies, vibrators transmit more energy into the earth around their fundamental vibrator-ground resonance frequencies than at other frequencies.

Using high frequency in addition to low frequency seismic waves in seismic prospecting results in better resolution than using only low frequency seismic waves. It is thus desirable to use vibrators to transmit seismic waves with high frequencies. As the seismic waves propagate through the earth, high frequency seismic waves are attenuated more severely than low frequency seismic waves. If the amplitudes of high frequency seismic waves after the attenuation are so small that, upon detection by geophones, the waves are indistinguishable from noise, such high frequency seismic waves are practically useless for seismic prospecting. Therefore, for the purpose of seismic prospecting, high frequency seismic waves must be transmitted with sufficiently high amplitudes to endure earth attenuation. Vibrators are weak seismic energy sources. While vibrators transmit sufficient energy to endure earth attenuation around their fundamental vibrator-ground resonance frequencies near the low end (10 Hz) of the seismic spectrum, they frequently do not transmit sufficient energy at frequencies higher than their fundamental vibrator-ground resonance frequencies, particularly at frequencies near 100 Hz, high end of the seismic spectrum. It is therefore desirable to improve the design of vibrators so that the vibrators can transmit more energy at frequencies higher than their fundamental vibrator-ground resonance frequencies, particularly at frequencies near the high end of the seismic spectrum.

SUMMARY OF THE INVENTION

A compliant member is connected between the driver and the base plate of a seismic vibrator. The compliance of the compliant member is such that it forms a substantially rigid connection between the driver and the base plate at the fundamental vibrator-ground resonance frequency but that, at certain higher frequencies, it forms a compliant connection. Therefore, at the fundamental vibrator-ground resonance frequency, the base plate vibrates in phase with the driver and the driver and driven load resonate together at this frequency. The compliance of the compliant member is also such that the natural frequency of the driven load of the vibrator is in the seismic spectrum of the vibrator but is higher than the fundamental vibrator-ground resonance frequency. At the natural frequency of the driven load, the base plate vibrates out of phase with the driver, and the driven load resonates even though the driver is vibrating but not resonating.

DESCRIPTION OF THE PREFERRED EMBODIMENTS

A compliant member is connected between the driver and the base plate of a seismic vibrator. The compliant member, the base plate, and the portion of the earth that moves with the base plate as it vibrates, compose the driven load of the vibrator. The compliance of the compliant member is such that the fundamental vibrator-ground resonance frequency, the member is a substantially rigid connection between the driver and the base plate, but at higher frequencies in the seismic spectrum, it is compliant. Thus, at the fundamental vibrator-ground resonance frequency, the base plate and the portion of earth that moves with it during vibration will vibrate substantally in phase with the driver so that the driver and driven load resonate together at this frequency. At higher frequencies the compliant member exhibits its compliant characteristics so that the base plate no longer necessarily vibrates in phase with the driver. At the natural frequency of the driven load for vertical vibrations, even though the driver is vibrating but not resonating, the driven load resonates. Therefore, this invention enables the vibrator to transmit substantial seismic energy around two frequencies in the seismic spectrum instead of around only one as in the prior art.

Figure 1:
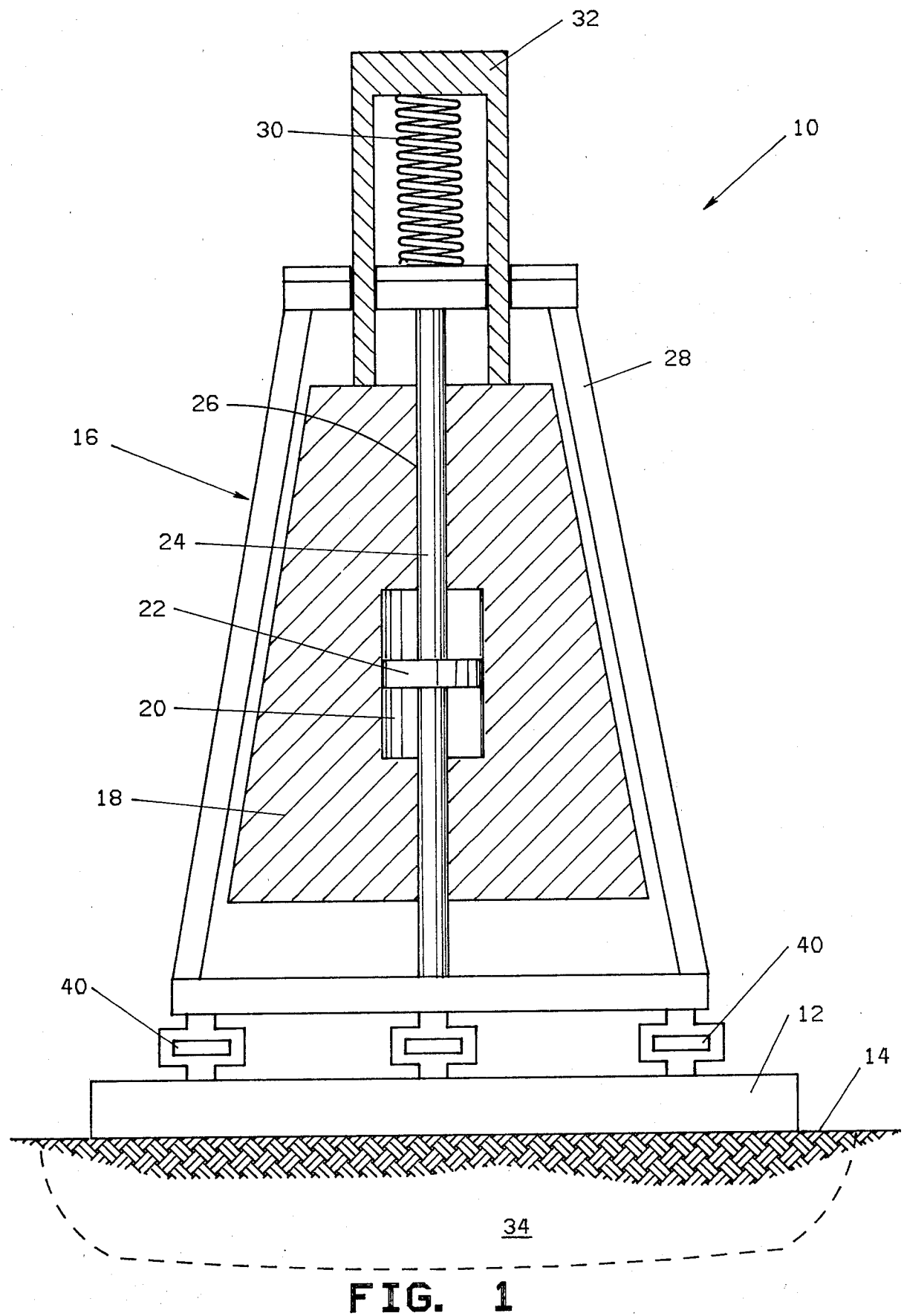
FIG. 1 is a schematic, simplified view of a seismic vibrator with a compliant connection between the driver and the base plate.

FIG. 1 is a simplified schematic representation of a seismic vibrator 10 embodying the invention. Such seismic vibrators are well known in the art; the details of such a vibrator are disclosed, for example, in U.S. Pat. No. 3,929,206 (1975) to Bedenbender et al.

Vibrator 10 includes a planar base plate 12 coupled to surface 14 of the earth. Vibrator 10 includes also a hydraulic driver 16 for reciprocating the base plate. Driver 16 comprises a reaction mass 18 defining a cylindrical chamber 20, a piston 22 of a diameter to fit sealingly into chamber 20 and placed in chamber 20, and a piston rod 24, attached to piston 22, extending through bore 26 in reaction mass 18. Driver 16 also includes a conventional mechanism (not shown in FIG. 1), for reciprocating piston 22 with respect to reaction mass 18, and a frame 28 to which piston rod 24 is attached at the top and bottom. Frame 28 supports reaction mass 18 through a spring 30 and a U-shaped connector 32. The resilience of spring 30 is such that reaction mass 18 is isolated dynamically from frame 28 at frequencies in the seismic spectrum. Frame 28 is connected to base plate 12 through one or more compliant members 40. Vertical vibrations of piston 22 are therefore transmitted through piston rod 24, frame 28, compliant members 40, base plate 12, to the earth surface 14, to generate pressure waves. A portion 34 of the earth contiguous to base plate 12 reciprocates vertically together with the base plate. Compliant members 40, base plate 12, and each portion 34 compose the driven load of vibrator 10. Reaction mass 18, piston 22, piston rod 24, frame 28, and the driven load form a vibrating system. This system has a natural frequency known as the fundamental vibrator-ground resonance frequency.

For substantially vertical vibrations, the combined compliance of compliant members 40 is such that, at the fundamental vibrator-ground resonance frequency, compliant members 40 form substantially rigid connections between frame 28 and base plate 12, but at higher frequencies, members 40 are compliant. The fundamental vibrator-ground resonance frequency is not substantially affected by the compliant members so that it is still between 15 and 25 Hz, near the low end of the seismic spectrum. If the driver vibrates at this fundamental vibrator-ground resonance frequency, the driven load vibrates substantially in phase with the driver so that both the driver and the driven load are resonating at this frequency. Therefore, vibrator 10 still has the capacity to transmit substantial pressure wave energy into the earth at frequencies near the low end of the seismic spectrum.

If the frequency at which piston 22 is vibrated is increased to a value higher than the fundamental vibrator-ground resonance frequency, the compliant characteristic of compliant members 40 becomes more evident. The driven load of vibrator 10 no longer reciprocates necessarily in phase with piston 22. At a certain frequency above the fundamental vibrator-ground resonance frequency, the driven load resonates vertically even though the driver is vibrating but not resonating. This occurs at the natural frequency of the driven load for vertical vibrations which varies with the combined compliance of members 40. At this frequency, vibrator 10 transmits substantial pressure wave seismic energy into the earth, more than that transmitted by vibrators where the piston is attached to the base plate through rigid connections.

If the combined weight of the frame and the piston rod is 1200 lbs., and the weight of the base plate 3000 lbs., and if the fundamental vibrator-ground resonance frequency is 25 Hz, and the spring constant of the compliant member for vertical vibrations $2.41 \times 10^6$ lbs./in., then the natural frequency of the driven load for vertical vibrations may be approximately 100 Hz. The compliant member is also substantially rigid at 25 Hz so that the fundamental vibrator-ground resonance frequency is substantially unaffected by the compliant connection between the piston and the base plate. Hence vibrator 10 can transmit substantial pressure wave seismic energy into the earth at 25 Hz as well as at 100 Hz. In general, if the compliant member is rigid at the fundamental vibrator-ground resonance frequency, the natural frequency of the driven load will be higher than the fundamental vibrator-ground resonance frequency. The natural frequency of the driven load is proportional to the square root of the spring constant of the compliant member. Vibrator 10 may thus be tuned to transmit more pressure wave seismic energy at a selected frequency in the seismic spectrum by choosing a compliant member with an appropriate spring constant for substantially vertical vibrations.

As shown above, by connecting the driver to the base plate through one or more compliant members with the appropriate compliances, the vibrator is then capable of transmitting substantial seismic energy at two natural frequencies in the seismic spectrum: the natural frequency of the driven load for vertical vibrations, and the fundamental vibrator-ground resonance frequency. Whether the vibrator is also capable of transmitting substantial seismic energy at frequencies in between the two natural frequencies depends on the widths of the two resonance peaks at the two natural frequencies. If both peaks are wide, then at many frequencies between the two natural frequencies, significant seismic energy is transmitted by vibrator 10. The peaks can be widened by reducing the weight of the base plate, or by increasing the area of the base plate. If the base plate weighs between 2000 and 3000 lbs. and is about 32 sq. ft. in area, the two resonance peaks are so broad in width the vibrator 10 may be capable of transmitting significant pressure wave seismic energy at all frequencies between the two natural frequencies.

Compliant members 40 may be of whatever shape and size and be constructed of any material so long as they have the desired compliance and are sturdy enough to withstand vibrations of the vibrator. While compliant members 40 are shown in FIG. 1 as rectangular blocks with holes therein, they may be in other shapes which are also within the scope of this invention. It will also be understood that other manners of connecting the compliant members to the driver and the base plate other than that shown in FIG. 1 may be used and come within the scope of this invention.

Figure 2:
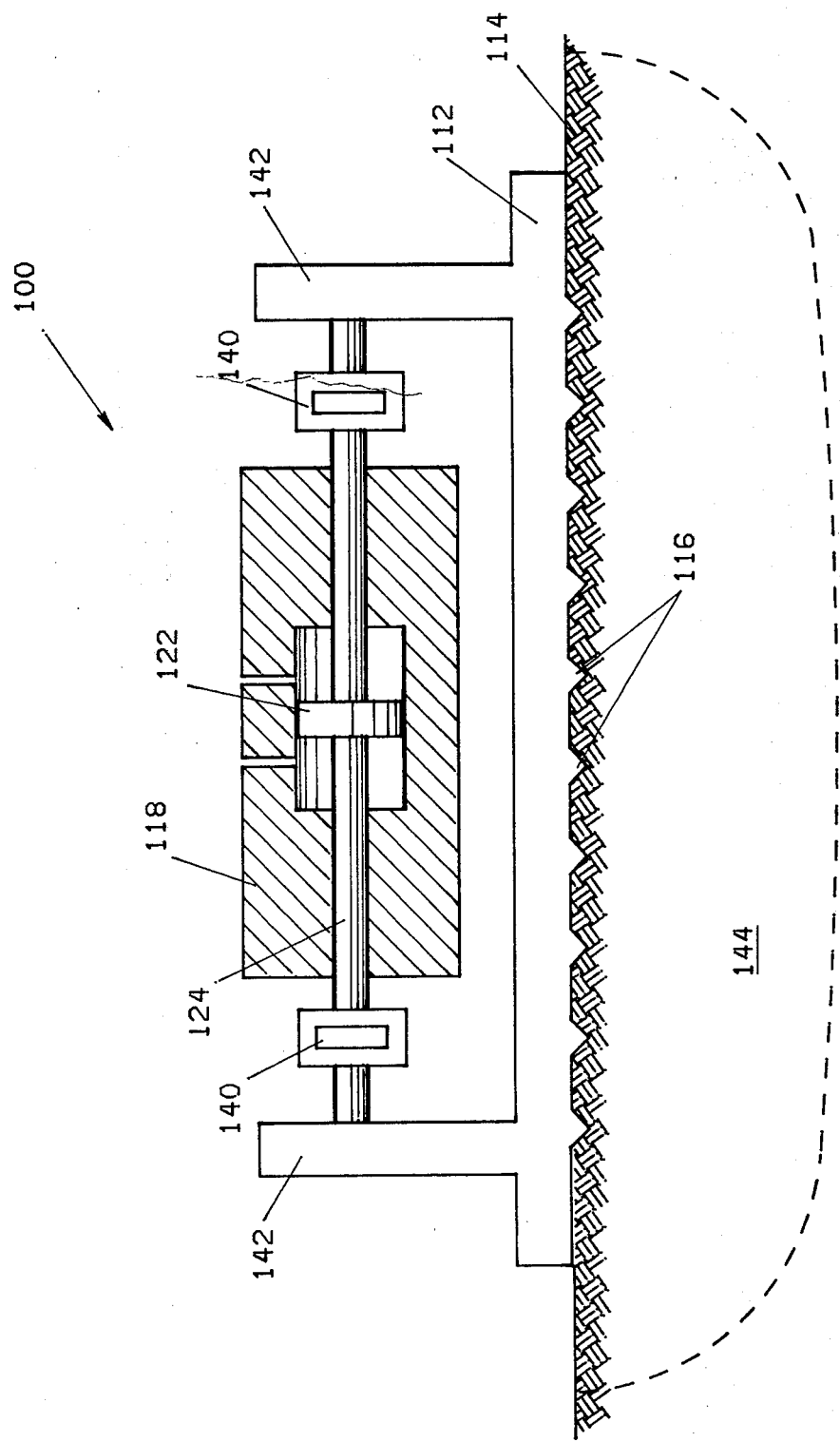
FIG. 2 is a schematic, simplified view of a shear wave vibrator with a compliant connection between the driver and the base plate.

FIG. 2 is a simplified schematic representation of a shear wave vibrator 100 illustrating the invention. Shear wave vibrators are well known in the art; the description of one such vibrator may be found in U.S. Pat. No. 3,286,783 (1966) to Cherry et al.

From FIG. 2, it will be recognized that the reaction mass 118, piston 122 and piston rod 124 assembly of vibrator 100 are similar in function to the reaction mass-piston assembly of vibrator 10 shown in FIG. 1, except that the reaction mass-piston assembly of vibrator 100 vibrates in a substantially horizontal direction instead of in a vertical direction as a vibrator 10, and except that piston rod 124 is connected to a base plate 112 through a pair of plates 142, instead of a frame as in vibrator 10. One or more compliant members 140 are connected between the piston rod and plates 142. The driven load of vibrator 100 consists of compliant member 140, plates 142, base plate 112, and the portion of earth 144 that moves with the base plate. With compliant members 140 so placed, they perform the same functions as the compliant members 40 of vibrator 10. Compliant members 140 are of such compliances that they form substantially rigid connections between the piston rod and plates 142 at the fundamental shear wave vibrator-ground resonance frequency, and that the natural frequency of the driven load of vibrator 100 for horizontal vibrations is in the shear wave seismic spectrum but is higher than the fundamental shear wave vibrator-ground resonance frequency. Therefore, vibrator 100 can transmit substantial shear wave seismic energy into the earth both at the fundamental shear wave vibrator-ground resonance frequency and at the natural frequency of the driven load for horizontal vibrations. Similar to vibrator 10, vibrator 100 may be tuned to transmit more shear wave energy at a selected frequency in the shear wave seismic spectrum by choosing a compliant member with an appropriate spring constant for substantially horizontal vibrations. Also similar to vibrator 10, the weight of base plate 112 may be chosen so that vibrator 100 can transmit substantial shear wave energy even at frequencies between the natural frequency of the driven load for horizontal vibrations and the fundamental vibrator-ground resonance frequency.

When shear waves propagate through the earth, they are attenuated by the earth more severely than pressure waves. Shear waves with frequencies between 50 and 100 Hz are so attenuated by the earth that they are not frequently used in seismic prospecting. The shear wave seismic spectrum is approximately 5 to 50 Hz. Typically, the fundamental shear wave vibrator-ground resonance frequency is around 10 to 15 Hz.

As in vibrator 10, the compliant members 140 may be connected to the base plate and the piston rod in any manner so long as the results described above are obtained. All such connections come within the scope of this invention. Compliant members 140 may also be in other shapes than rectangular, which are also part of this invention.

The above description of structure used is merely illustrative thereof, and various changes in shapes, sizes, or other details of construction may be made within the scope of the appended claims, without departing from the scope of the invention.

What is claimed is:

1. A seismic vibrator for imparting vibratory energy into the earth, comprising:
   a base plate adapted for coupling the vibrator to the surface of the earth;
   a reaction mass defining therein a cylindrical chamber;
   a piston mounted in the chamber;
   means for adding and withdrawing fluid under pressure from the chamber on both sides of the piston to reciprocate the piston; and
   a compliant rectangular block having a hole therethrough, said hole passing through the block in a direction transverse to the path of reciprocating motion of the piston, connected between the piston and the base plate, said block having a compliance such that it forms a substantially rigid connection between the piston and the base plate at the fundamental vibrator-ground resonance frequency, and that the natural frequency of the driven load of the vibrator is in the seismic spectrum of the vibrator and is higher than the fundamental vibrator-ground resonance frequency.

* * * * *